US008266411B2

(12) United States Patent
Gemmeke et al.

(10) Patent No.: US 8,266,411 B2
(45) Date of Patent: Sep. 11, 2012

(54) INSTRUCTION SET ARCHITECTURE WITH INSTRUCTION CHARACTERISTIC BIT INDICATING A RESULT IS NOT OF ARCHITECTURAL IMPORTANCE

(75) Inventors: Tobias Gemmeke, Stutensee (DE); Markus Kaltenbach, Leinfelden (DE); Nicolas Maeding, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/366,169

(22) Filed: Feb. 5, 2009

(65) Prior Publication Data

US 2010/0199074 A1  Aug. 5, 2010

(51) Int. Cl.
*G06F 9/30* (2006.01)
(52) U.S. Cl. ...................... 712/218; 712/226
(58) Field of Classification Search ................. None
See application file for complete search history.

(56) References Cited

U.S. PATENT DOCUMENTS

| | | | | |
|---|---|---|---|---|
| 5,557,763 | A | * | 9/1996 | Senter et al. ............ 712/23 |
| 5,913,925 | A | * | 6/1999 | Kahle et al. ............ 712/206 |
| 6,092,175 | A | * | 7/2000 | Levy et al. ............ 712/23 |
| 6,145,074 | A | * | 11/2000 | Asato ............ 712/218 |
| 6,314,511 | B2 | * | 11/2001 | Levy et al. ............ 712/217 |
| 7,197,601 | B2 | | 3/2007 | Slegel et al. |
| 7,281,115 | B2 | | 10/2007 | Siegel et al. |
| 7,284,100 | B2 | | 10/2007 | Slegel et al. |
| 2002/0087836 | A1 | * | 7/2002 | Jourdan et al. ............ 712/217 |
| 2006/0101434 | A1 | * | 5/2006 | Lake et al. ............ 717/140 |

OTHER PUBLICATIONS

A Comparison of Full and Partial Predicted Execution Support for ILP Processors, Scott A. Mahlke et al., Center for Reliable and High-Performance Computing, University of Illinois, Urbana-Champaign, IL 61801.
Organization and Implementation of the Register-Renaming Mapper for Out-of-Order IBM POWER4 Processors, T.N. Buti, et al., IBM J. Res. & Dev., vol. 49, No. 1, Jan. 2005.
IBM POWER6 Accelerators: VMX and DFU, L. Eisen, et al., IBM J. Res. & Dev., vol. 51, No. 6, Nov. 2007.
Impact of Dynamic Allocation of Physical Register Banks for an SMT Processor, Norito Kato, et al., Proceedings of the Innovative Architecture for Future Generation High-Performance Processors and Systems (IWIA'04), IEEE, Computer Society.
Binary Floating-Point Unit Design: The Fused Multiply-Add Dataflow, Eric M. Schwarz., IBM Corp., MS:P310, 2455 South Road Poughkeepsie, NY, 12601. (Submitted by Author for publication in High-Performance Energy-efficient Microprocessor Design, http:www.ecampus.com/book/0387285946, Sep. 20, 2007, 17:49, as Chapter 8).

* cited by examiner

*Primary Examiner* — Keith Vicary
(74) *Attorney, Agent, or Firm* — Cantor Colburn LLP; Randall Bluestone (57) ABSTRACT

Instead of having a processor with an instruction set architecture (ISA) that includes fixed architected operands, an improved processor supports additional characteristic bits for computing instructions (e.g., a multiply-add, load/store instructions). Such additional bits for the certain instructions influence the processing of these instructions by the processor. Also, a new instruction is introduced for further usage of the proposed method. Typically these additional characteristic bits as well as the instruction can be automatically generated by compilers to provide relatively well-suited instruction sequences for the processor.

12 Claims, 12 Drawing Sheets

INSTRUCTION SET ARCHITECTURE WITH INSTRUCTION CHARACTERISTIC BIT INDICATING A RESULT IS NOT OF ARCHITECTURAL IMPORTANCE

BACKGROUND

The present invention relates generally to processors, and, more particularly, to a processor having an instruction set architecture (ISA) with decomposing operands.

In the field of processors it is common to execute instructions in an "in-order" sequence. That is, the instruction is fetched, and if the input operands are all available, e.g., in registers, the instruction is dispatched to the appropriate functional unit of the processor for execution thereby. If one or more of the operands are unavailable during the current clock cycle, e.g., because they are being fetched from memory, the processor pauses operation or stalls until all of the operands are available. Once all operands are available, the instruction is executed by the appropriate functional unit, which then writes the results back to the register file.

It is also known to execute instructions in an "out-of-order" sequence. That is, after the instruction is fetched, the instruction waits in a queue until all of the input operands are available. When available, the instruction is allowed to leave the queue and is issued to the appropriate functional unit where it is executed.

Out-of-order processing allows the processor to avoid a class of processor stalls that occur when the data (i.e., operands) needed to perform an operation are not all available to the processor. An out-of-order processor fills the processor stall periods with other instructions that are ready to be executed, then re-orders the results to make it appear that the instructions were processed as normal. The benefits of out-of-order processing increase as the instruction pipeline deepens and the speed difference between main memory or cache memory and the processor widens. On a typical modern computer, the processor runs many times faster than the memory. Thus, during the time that an in-order processor spends waiting for the operand data to arrive for processing, an out-of-order processor instead could have processed a larger number of instructions.

In addition, it is known for processors to support simultaneous multithreading (SMT), which is a technique for improving the overall efficiency of processors. SMT permits multiple independent threads of execution to better utilize the resources provided by modern processor architectures. In SMT, instructions from more than one thread can be executed in any given pipeline stage at a time. This is done without relatively large changes to the basic processor architecture. The main additions needed are the ability to fetch instructions from multiple threads in a cycle, and a larger register file to hold data from multiple threads. Most SMT implementations typically have two threads.

A state-of-the-art, in- or out-of-order processor typically utilizes fixed architectural or architected operands, for example, 64 architected registers for each thread. This leads to 256 architected registers in the case of a four-way SMT processor with an instruction set that defines 64 registers per thread. In an out-of-order processor, the rename space also increases the demand for registers. This leads to a register file in the processor with a relatively large amount of entries. The register file bandwidth—read and write—is limited; thus, instructions in the issue queues that are ready for execution may be discarded. With the increase of entries in a register file, due to its design the available read and write ports may be limited to enable functionality of the register file. The compiler generally has relatively good knowledge of register usage. For example, a "memfree" command may be used to free up system memory.

However, with these techniques there is no way to let the hardware know that a register will no longer be needed. The available hardware is typically capable for a worst case scenario, but the hardware in general is not used as efficiently as possible. That is, every instruction writes its results back into the register file. Issue slots may be wasted because of register file limitations, which is in addition to limited issue or read bandwidth. It is assumed that all threads executed simultaneously will need 64 architected plus rename registers. All intermediate results and operands are typically used only once and are saved until overwritten, while rename buffers are kept until completion.

BRIEF SUMMARY

According to an embodiment of the invention, a method includes providing a processor, and causing the processor to execute an instruction, wherein the instruction includes additional characteristic bits. For each source operand, if defined, one of the characteristic bits marks that this register is used for a last time, which indicates that this register entry (operand) may be decomposed after usage because no other instruction depends on this operand beyond this point of execution. A second one of the characteristic bits indicates that a characteristic of the result of the instruction being executed is of intermediate kind (i.e., not the final result or not of architectural importance), which does not need to be architected, if a direct bypass or forwarding is possible.

According to another embodiment of the invention, a system for implementing a method includes a computing network including a processing device in communication with one or more computer memory storage devices. The computing network is further configured to implement a method that includes providing a processor, and causing the processor to execute an instruction, wherein the instruction includes additional characteristic bits. For each source operand, if defined, one of the characteristic bits marks that this register is used for a last time, which indicates that this register entry (operand) may be decomposed after usage because no other instruction depends on this operand beyond this point of execution. A second one of the characteristic bits indicates that a characteristic of the result of the instruction being executed is of intermediate kind (i.e., not the final result or not of architectural importance), which does not need to be architected, if a direct bypass or forwarding is possible.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

DETAILED DESCRIPTION

Figure 1:
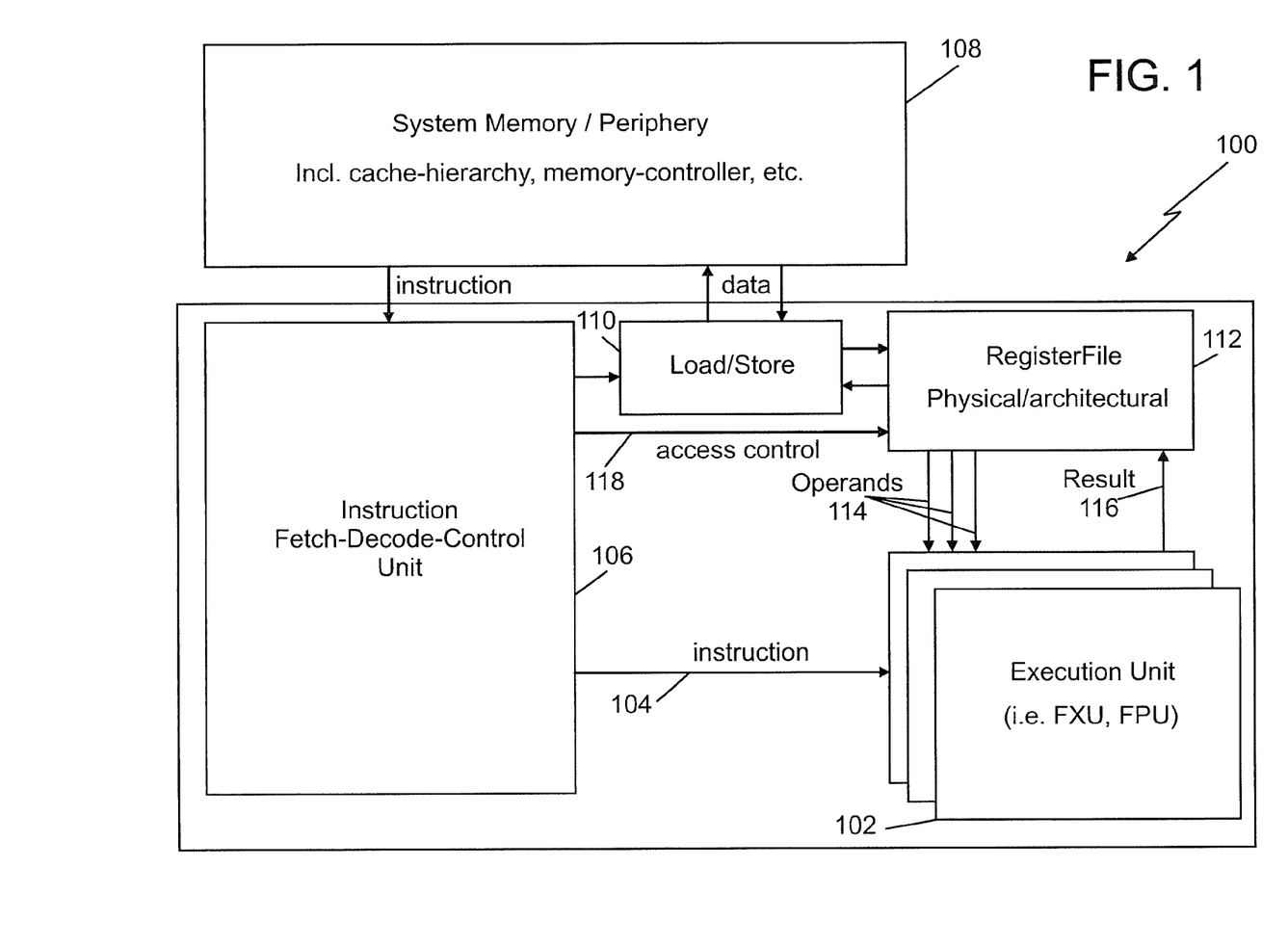
FIG. 1 is a block diagram of a processor in which an embodiment of the invention may be implemented.

Referring to FIG. 1, there illustrated is a block diagram of a processor 100 in which embodiments of the invention may be implemented. The processor 100 may be any type of processor, including a floating point processor or a non floating point processor, as described and illustrated in more detail hereinafter with respect to the general purpose computer of FIG. 12. The processor 100 may include one or more execution units 102 that may receive instructions 104 for execution thereby from an instruction fetch-decode-control unit 106. The instruction fetch unit 106 may receive the instructions for execution from system memory 108, which may be located apart from the processor 100 as shown in FIG. 1. The system memory/periphery 108 may include cache-hierarchy memory, a memory controller, and other devices or functional units as are known. The processor 100 may also include a load/store unit 110 under control of the instruction fetch unit 106 for transmitting and receiving data (e.g., operands) with the system memory 108. The load/store unit 110 may also transmit and receive data with a register file 112 that is part of the processor 100. The register file 112 provides the operands 114 to the processor execution unit 102 and receives the result 116 back from the execution unit 102 after the execution unit 102 has completed processing of an instruction. The register file 112 may receive a control signal ("access control") 118 from the instruction fetch unit 106.

Instead of having a processor 100 with an instruction set architecture (ISA) that includes fixed architected operands, embodiments of the invention relate to an improved processor 100 that supports additional characteristic bits for all instructions that read to or write from registers (i.e., instructions that compute, load or store data). For each source and target register defined for each instruction in the ISA, one or more characteristic bits are added. The additional bits influence the processing of these instructions by the processor 100. Based on embodiments of the present invention, a compiler can automatically generate, or a software developer can generate, relatively well-suited instruction sequences for the processor. The compiler feeds knowledge into the binary code. This can be considered as an extension to the ISA of the processor 100.

In an embodiment, a first additional characteristic bit indicates a non-architected result (the "NA" bit), while a second additional bit (the "LU" bit) indicates a last-usage information per operand. Further, an additional "regfree" instruction is added to the instruction set of the processor 100, to explicitly withdraw architected registers (i.e., "decomposing" or "disappearing" operands). The processor 100 can benefit from this code as there is no need to save data in the register file 112, which results in power saving. Also, there exist added execution slots; i.e., a higher issue slot count exists because the register file write bandwidth is saved. Also, there is an instant addition to "freelist" (i.e., an "explicit freelist") in the case of an out-of-order processor, which results in a relatively large rename space of such processor. In-order processors typically have no freelist as such, but could have an implied freelist, or in the case of SMT, a mapping between physical and architected registers.

Figure 2:
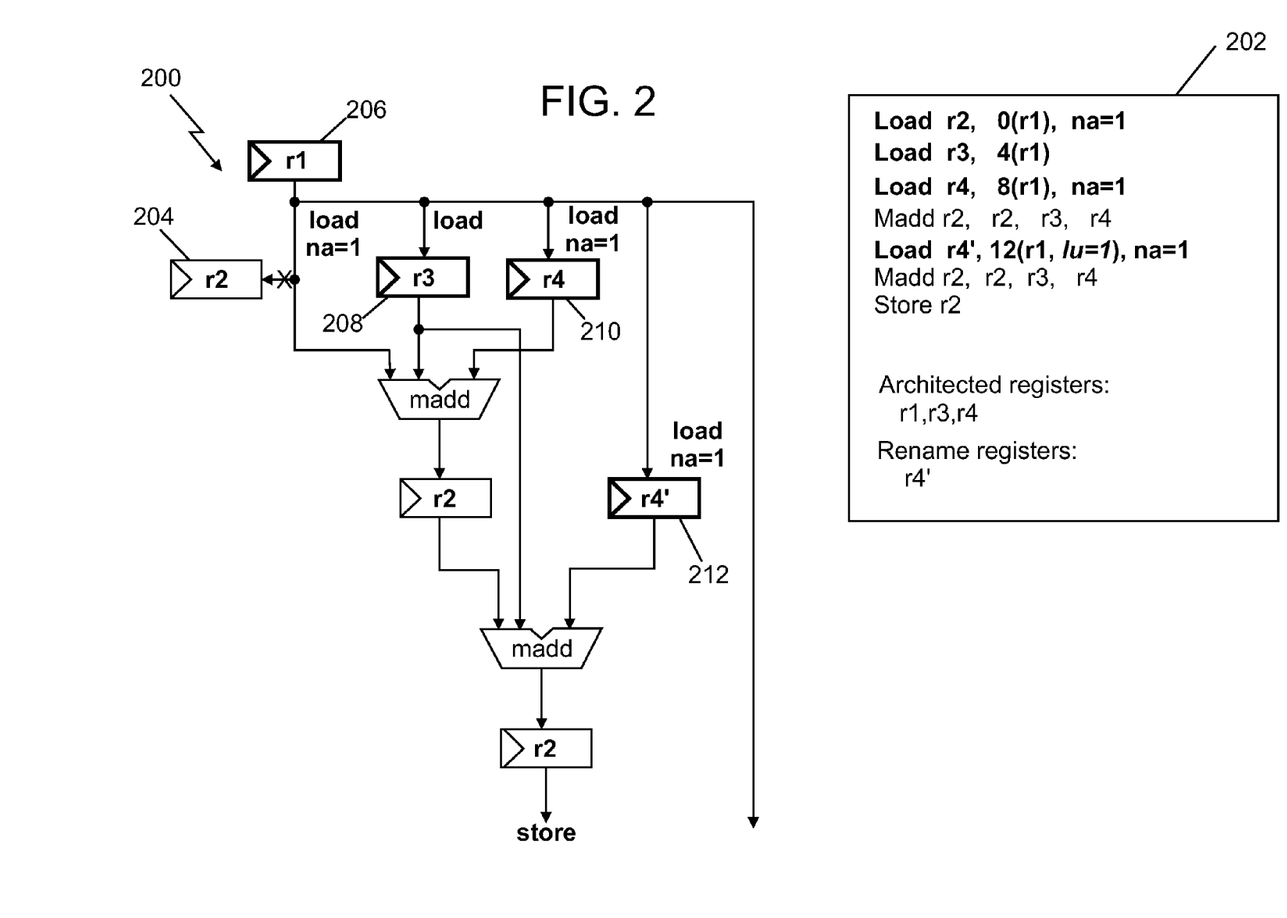
FIG. 2 is a flow diagram and corresponding instruction list in the execution of a code snipplet according to an embodiment of the invention.

Referring to FIG. 2, there illustrated is a flow diagram 200 and corresponding instruction list 202 in the execution of an example of a code snipplet that includes multiply-add ("Madd") and load/store instructions according to an embodiment of the invention. The Madd instruction (or any other instructions suitable for embodiments of the invention) may be executed as an out-of-order instruction. However, the provided code (or, similarly, any other instructions suitable for embodiments of the invention) is equally suitable for execution as an in-order instruction. As seen in FIGS. 2-5, embodiments of the invention are applied to load and store instructions. However, it is to be understood that embodiments of the invention can be applied to any instructions that are applied to registers and in any sequence of such instructions.

As shown in FIG. 2, the register r2 204 may be loaded with the value of the memory address relative to the address provided in r1 206. However, if the value of the NA bit equals 1, then information is made available that data to be written to register r2 204 are of no architectural importance in the event that a fast direct bypass or forwarding is possible, thereby removing the need to write data to the register file 112. A fast direct bypass refers to the situation where an intermediate result will be utilized relatively soon. Forwarding refers to the situation where the intermediate result may be forwarded to calculation logic. Also, based on the out-of-order structure of the processor 100 in an embodiment, it is possible to issue the other instructions written in bold characters in FIG. 2 after they do not depend on any other further instruction in this code example. Based on this, other architected registers r3 208 and r4 210 are loaded with the values of the memory address provided by the corresponding load instructions. A rename register r4' 212 is defined because of the duplicated usage of r4 in this code snipplet. FIG. 2 illustrates an embodiment of the invention, while the available bandwidth of a processor may limit the ability to issue a specific amount of load instruction at one given point in time.

Figure 3:
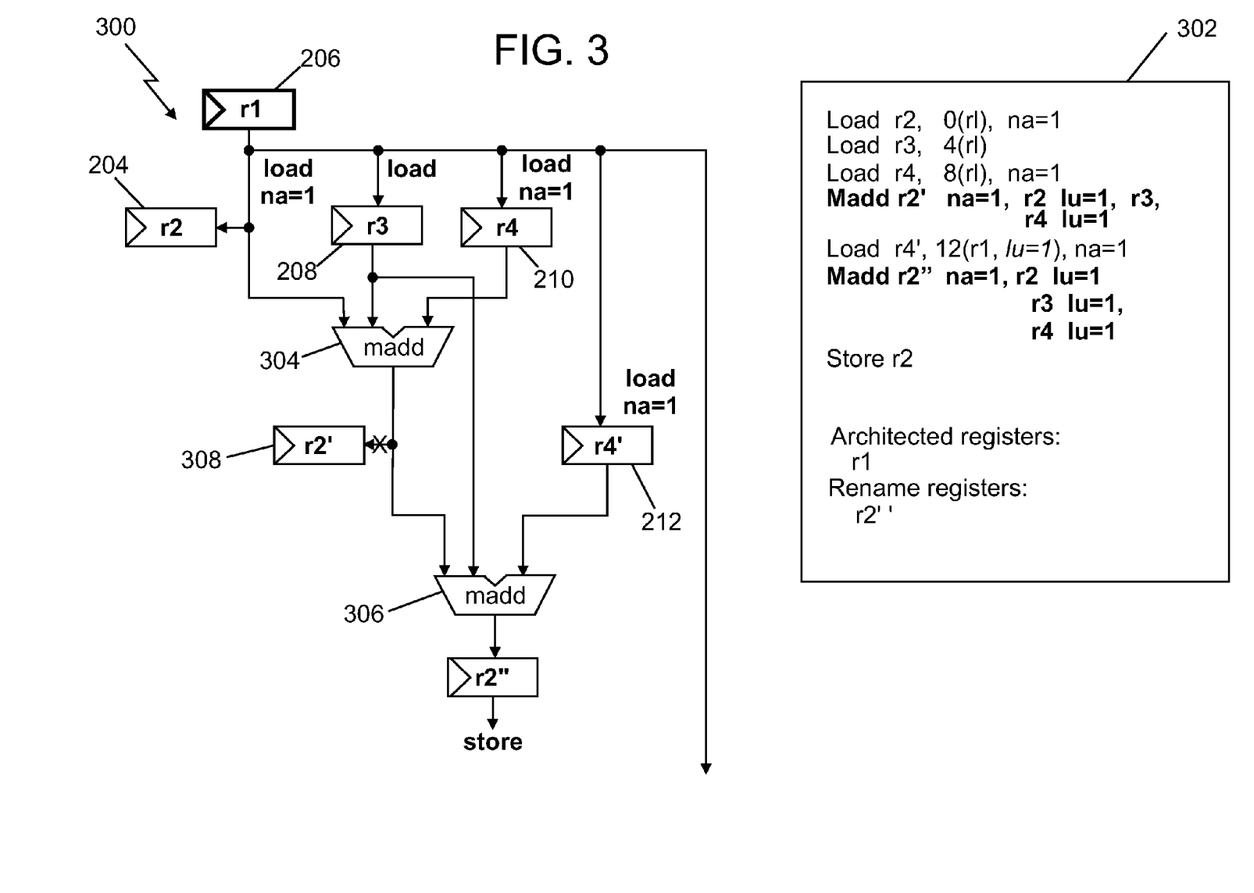
FIG. 3 is another flow diagram and corresponding instruction list in the execution of a code snipplet according to an embodiment of the invention.

Referring to FIG. 3, there illustrated is another flow diagram 300 and corresponding instruction list 302 in the execution of the code snipplet example of an embodiment of the invention. Here, the multiply-add instruction illustrated by 304 is executed based on the operand data provided to it. The last usage information as indicated by the LU bit allows the processor 100 to decompose the registers r2 204 and r4 210 as soon as the instruction 304 is executed. If the result of the Madd instruction 304 can be directly forwarded or bypassed to an execution of the Madd instruction 306 based on the NA bit equals 1, then two implications apply. There is no need to either write data to the rename register r2' 308 of the register file 112, nor does this rename register 308 need to be allocated. Such direct bypass may be forced by the processor 100 based on the indication that the NA bit equals 1. In case both Madd instructions 304 and 306 can be successfully executed, the architectural state of registers r2-r4' may be released according to an embodiment of the invention.

Figure 4:
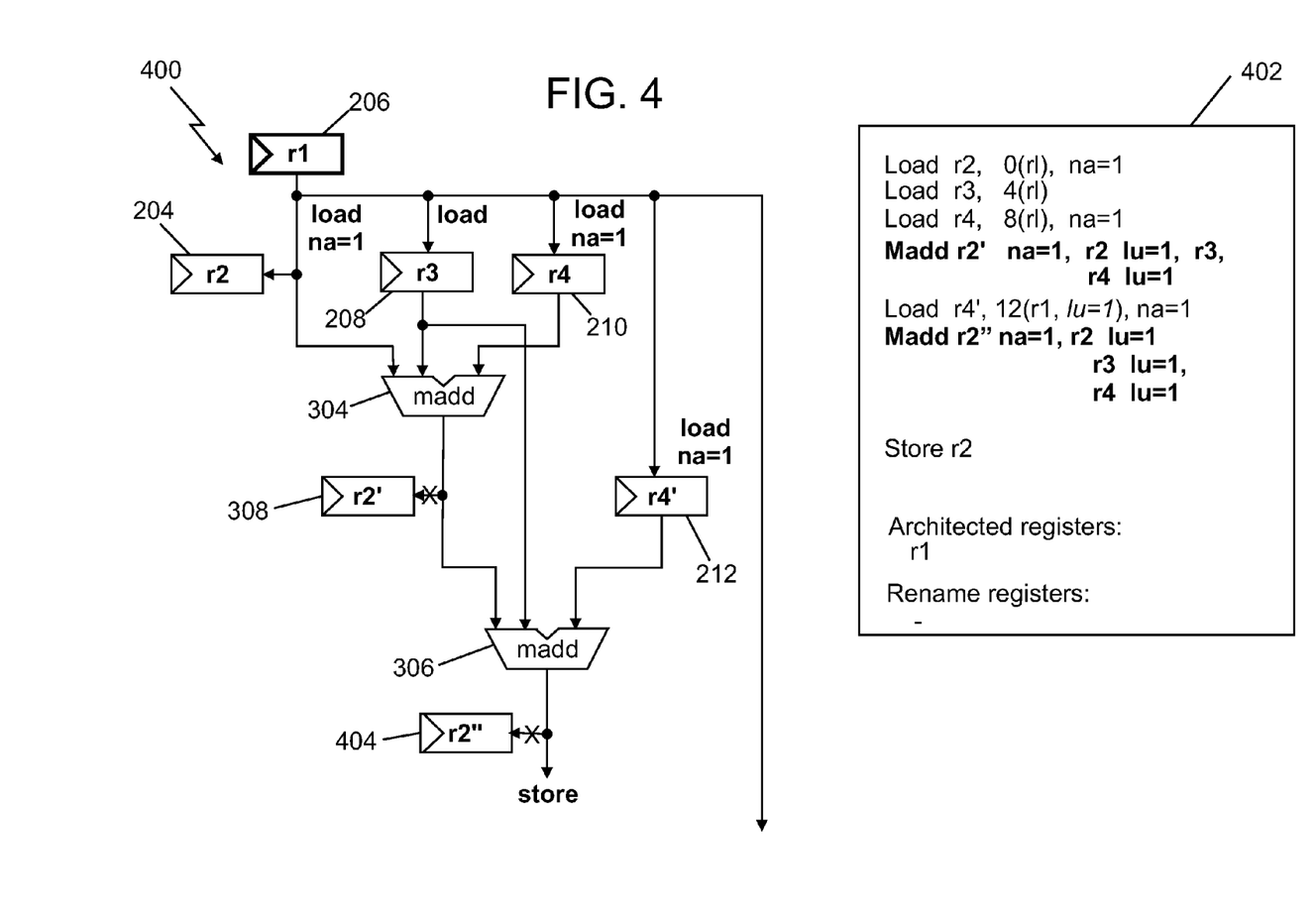
FIG. 4 is still another flow diagram and corresponding instruction list in the execution of a code snipplet according to an embodiment of the invention.

Referring to FIG. 4, there illustrated is a flow diagram 400 and corresponding instruction list 402 of a store step in the execution of the code snipplet example according to an embodiment of the invention. FIG. 4 illustrates the possibility of even more aggressive instruction scheduling enabled by embodiments of the invention. Due to the NA bit equaling 1 and type information present, the processor 100 may also spare the allocation and write of register r2" if direct bypass into the store instruction is possible.

Figure 5:
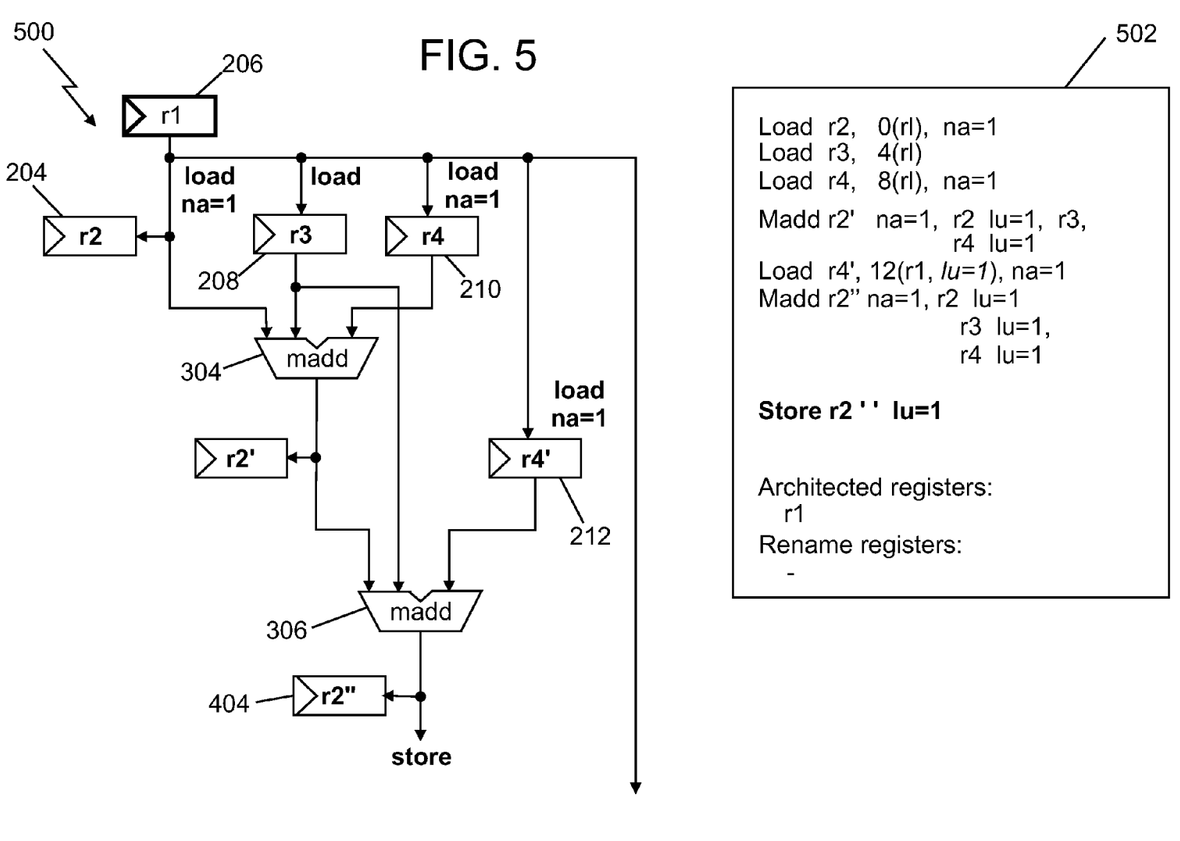
FIG. 5 is yet another flow diagram and corresponding instruction list in the execution of a code snipplet according to an embodiment of the invention.

Referring to FIG. 5, there illustrated is a flow diagram 500 and corresponding instruction list 502 of an alternative behavior in the execution of the code snipplet example based on the LU bit according to an embodiment of the invention. Here, unnecessary data no longer blocks physical resources and allows for a relatively smaller rename space and more speculative instructions in flight. Based on the LU bit equaling 1, even in case the register r2" 404 had to be written and allocated it is still decomposed as soon as the store instruction 406 is executed.

Figure 6:
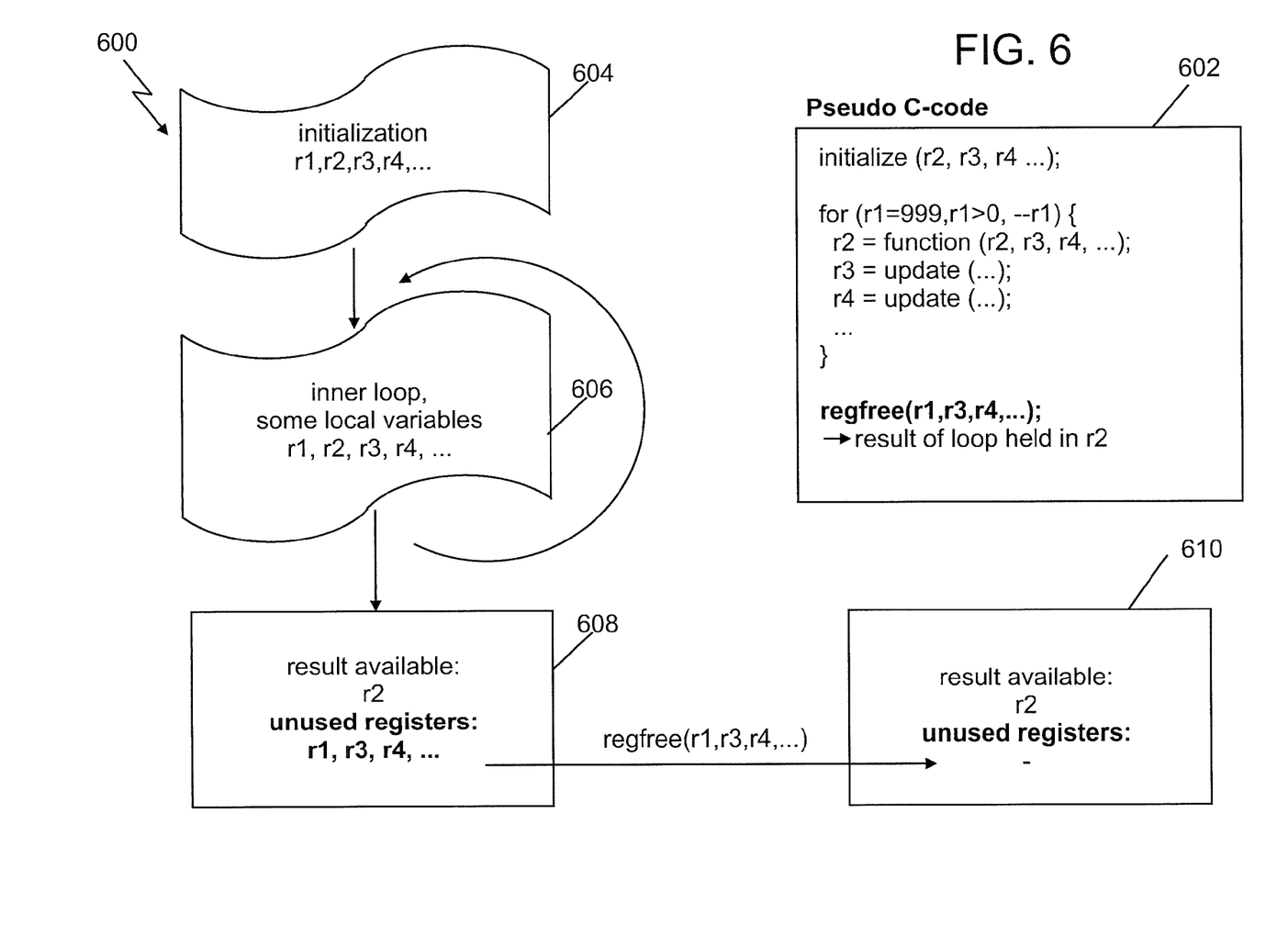
FIG. 6 is a flow diagram and corresponding instruction list of the additional "regfree" instruction which is added to the instruction set of the processor to explicitly withdraw architected registers.

Referring to FIG. 6, there illustrated is a flow diagram 600 and corresponding instruction list 602 in Pseudo C-code of the additional "regfree" instruction that is added to the instruction set of the processor to explicitly withdraw architected registers (i.e., "decomposing" operands). After an initialization step 604, an inner loop 606 considers some local register variables and the result of this loop is available in register r2 in the block 608. However, several unused registers (r1, r3, and r4) are identified in this block 608. The "regfree" instruction is executed and frees up these registers, as shown in the pseudo code 602. This leads to the final register usage as shown in block 610.

Figure 7:
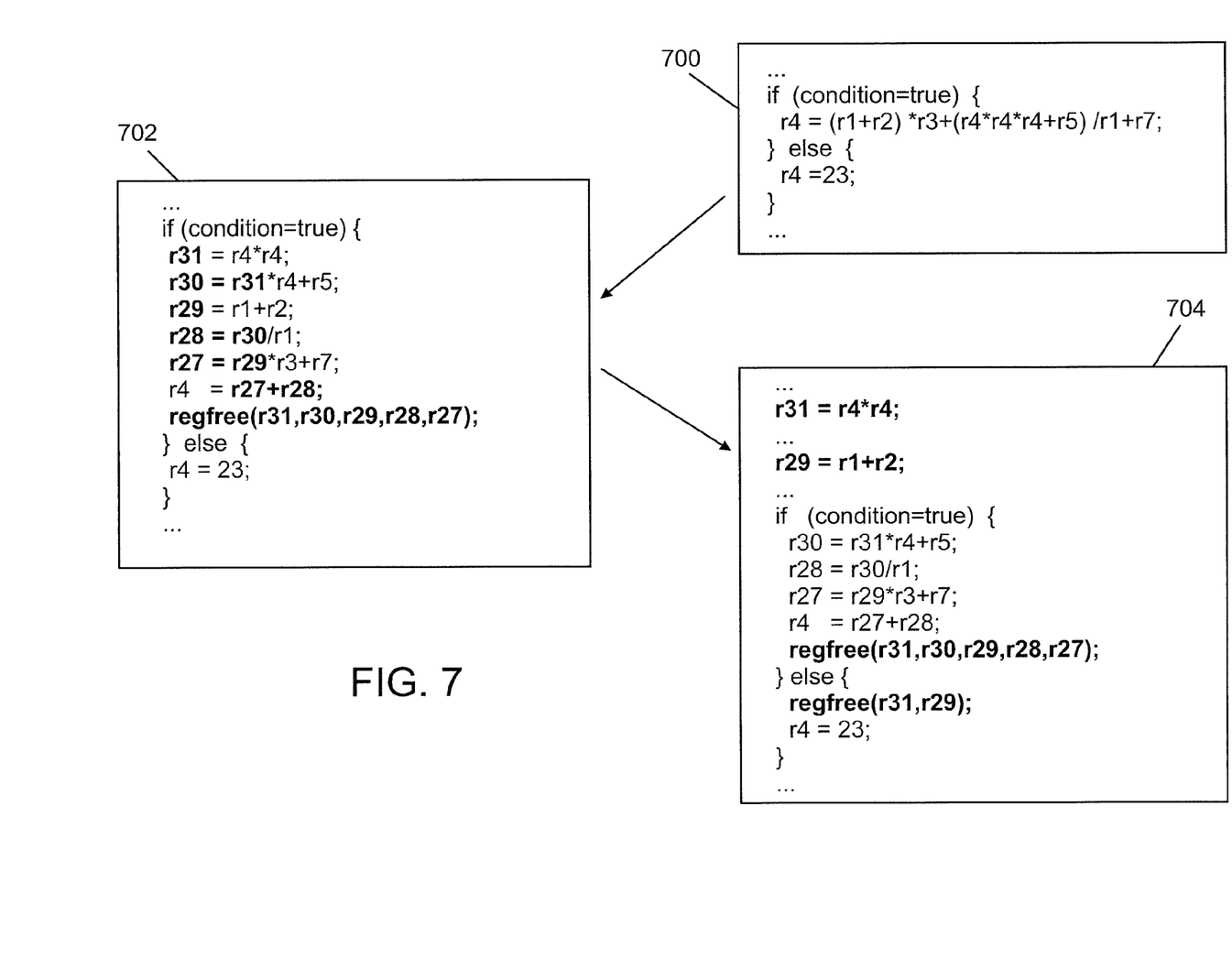
FIG. 7 illustrates an example of execution of the "regfree" instruction in a code snipplet with a branch.

Referring to FIG. 7, there illustrated is an example of execution of the "regfree" instruction in a different code segment including conditional branches. Specifically, a block 700 of Pseudo C-code specifies that if certain conditions take place, then a branch occurs. In the block 702, the compiler may introduce several intermediate results. There, the "regfree" instruction explicitly frees tied up resources (or the NA/LU bits may be used). Then due to pipeline utilization, the compiler may, in the block 704, decide to pre-compute some of the results as they fit relatively well in between the other instructions before the branch. For example, in the block 704, the processor is notified that r31 and r29 were only speculatively computed and were not needed in this part of the branch.

Advantages of embodiments of the present invention include higher issue bandwidth and less power consumption. Also, the processor makes more efficient use of rename buffers and there exists reduced effort during thread switch due to the mandatory set of registers being defined. The costs of implementing embodiments of the present invention are relatively small, and include the fact that the ISA needs to invest additional bits to transport information. Also, recovery has to take into account that intermediate results are not available in the register file.

Figure 8:
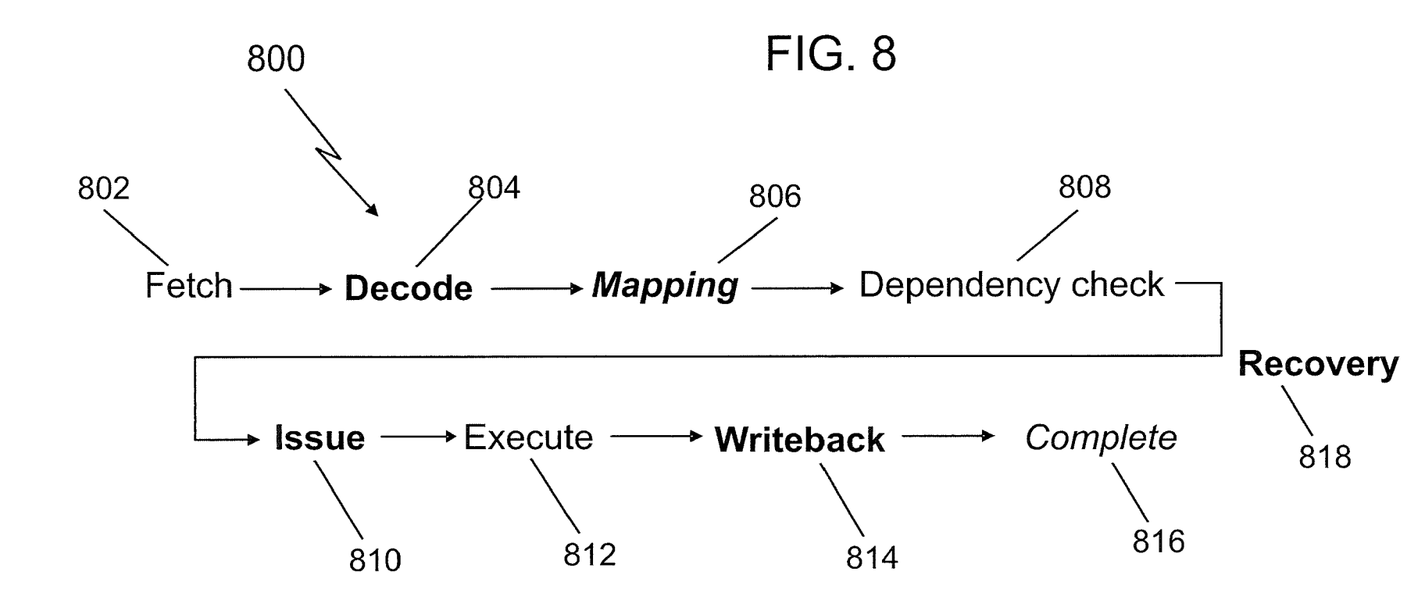
FIG. 8 illustrates a processing sequence according to an embodiment of the invention.
Figure 9:
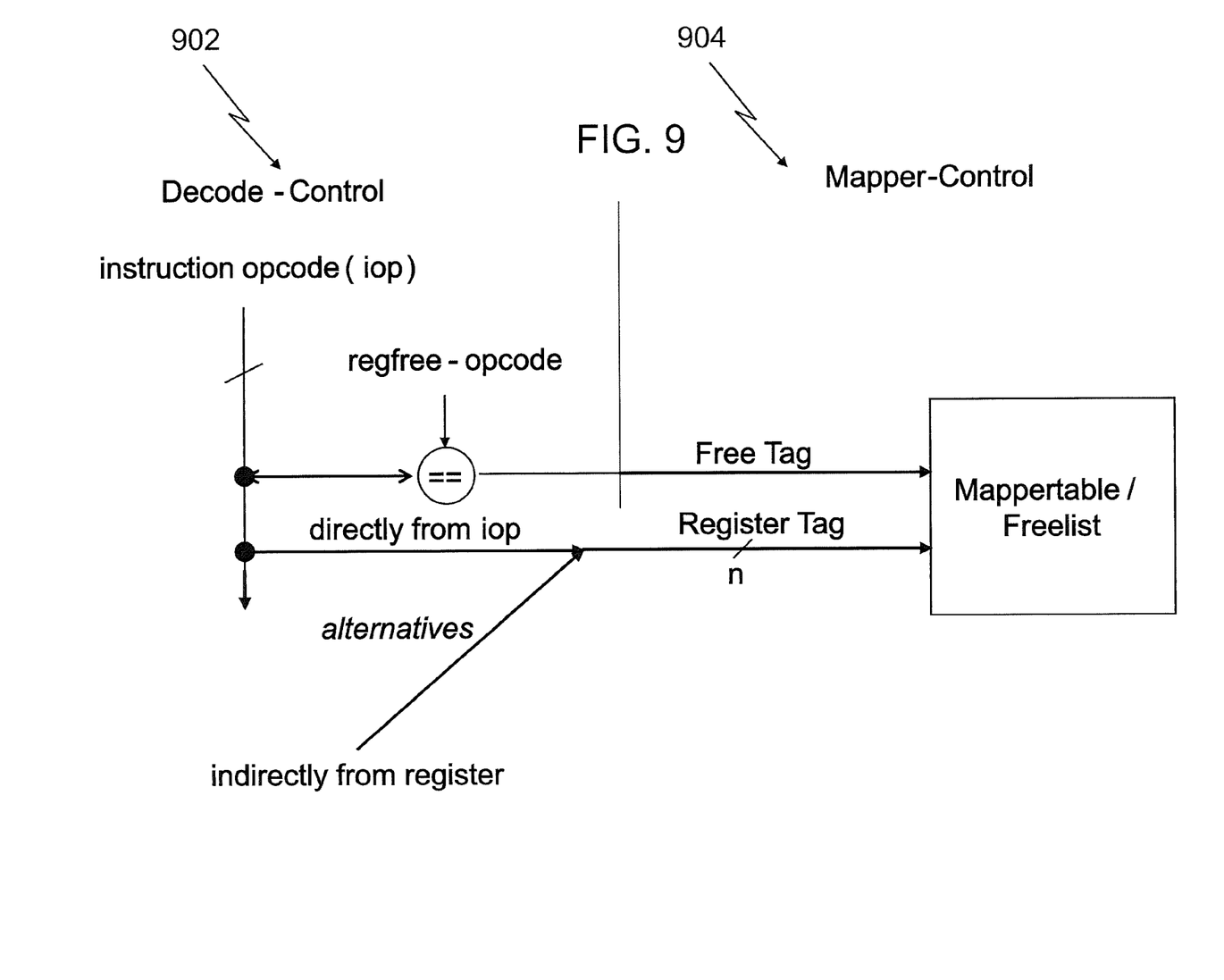
FIG. 9 illustrates the interface between decode-control logic and mapper-control logic within a processor having an ISA that implements embodiments of the invention.

Referring to FIG. 8, an overview 800 of a processing sequence according to embodiments of the invention starts with the fetch instruction step 802, followed by a decode step 804 that may be modified in accordance with embodiments of the invention by adding the "regfree" instruction to the decode step 804. This is illustrated in FIG. 9, which shows the interface between the decode-control logic 902 and the mapper-control logic 904 within a processor 100 having an ISA that implements embodiments of the invention. Specifically, FIG. 9 illustrates the "regfree" opcode and the situation where that opcode equals the instruction opcode next up for execution in which the enable signal "Free Tag" is used to free up a register from within the freelist. There the registers to be freed up may either be given by the instruction opcode itself or may be based on a register entry.

Figure 10:
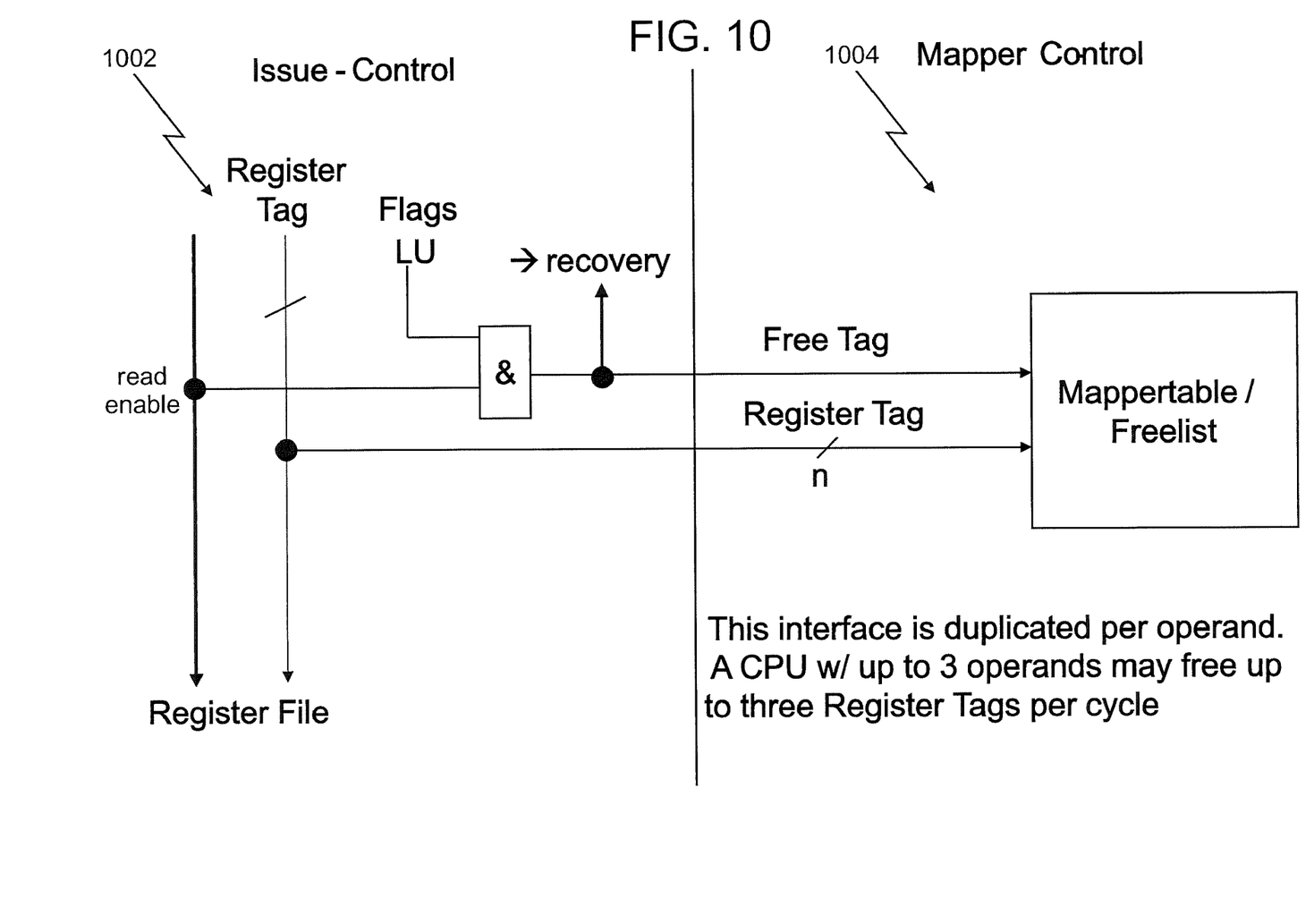
FIG. 10 illustrates the interface between issue-control logic and mapper-control logic within a processor having an ISA that implements embodiments of the invention.

Next, a mapping step 806 is executed in which the processing is extended in that the "regfree" instruction can add entries to the freelist. Instructions involving the LU bit cause the corresponding operand to be dropped from the mapper besides being added to the freelist, and the non-architected (NA) bit triggers either the issue step 810 or the writeback step 814 in the event a direct bypass is or will be used such that the result register is not needed and the corresponding register in the register file 112 is overwritten (that is, a corresponding mapping is obsolete). Next, a dependency check step 808 is executed, followed by the issue step 810 in which a processor with up to three operands may free up to three register tags per cycle. This is illustrated in FIG. 10 which shows the interface between the issue-control logic 1002 and the mapper-control logic 1004 within a processor 100 having an ISA that implements embodiments of the invention. In this figure the LU bit is indicated as a flag. In case the enable signal "Free Tag" equals 1 the recovery unit, if present in the processor 100, might be informed as well.

Figure 11:
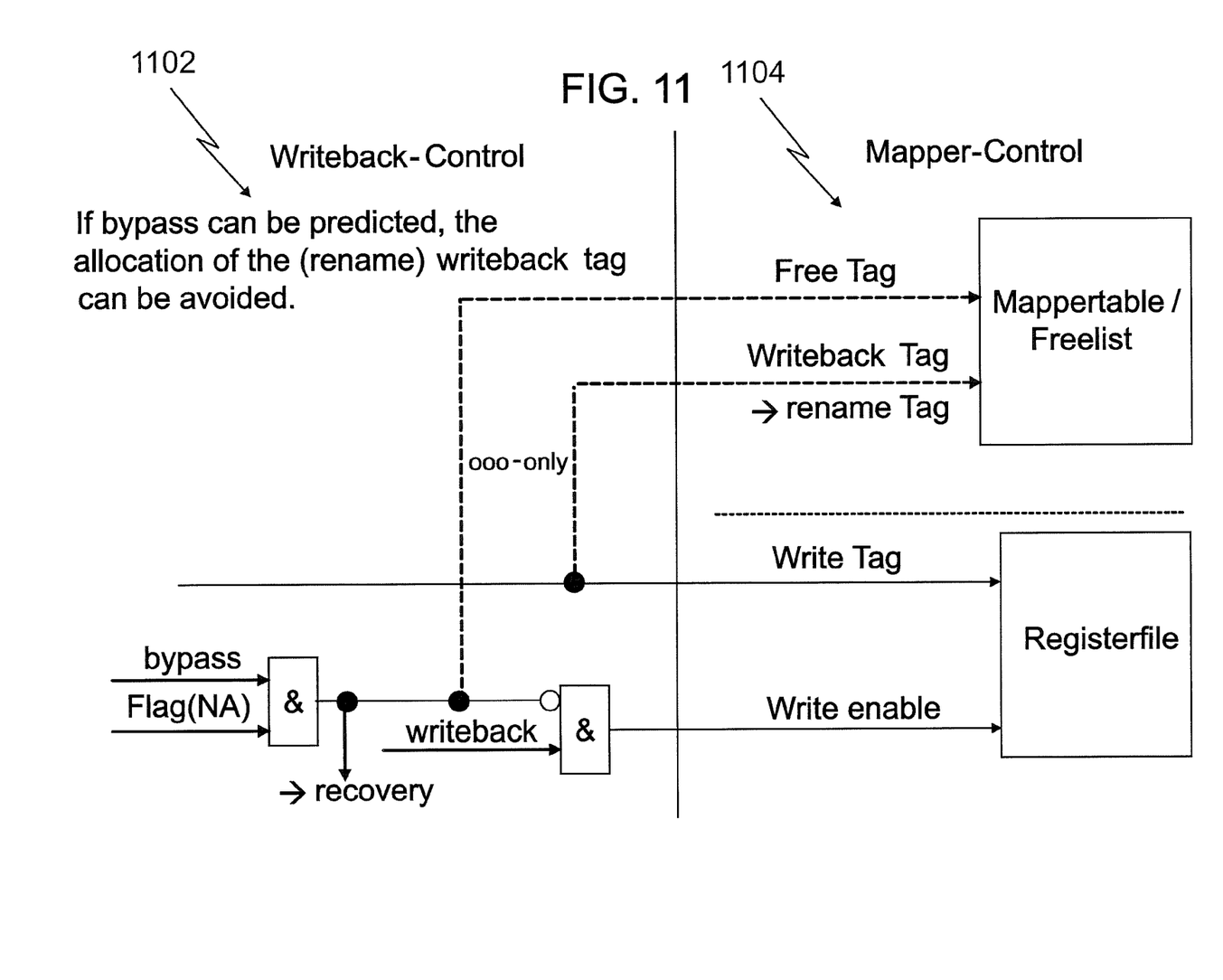
FIG. 11 illustrates the interface between writeback-control logic and mapper-control logic within a processor having an ISA that implements embodiments of the invention.

This is followed by an execute step 812 and then the writeback step 814 that includes both writeback control and mapper control. In the writeback control, if the bypass can be predicted, the allocation of the rename writeback tag can be avoided. This is illustrated in FIG. 11 which shows the interface between the writeback-control logic 1102 and the mapper-control logic 1104 within a processor 100 having an ISA that implements embodiments of the invention. In this figure the NA bit is indicated as a flag. Also, FIG. 11 illustrates the Free Tag and the Writeback Tag for use with out-of-order processing.

Finally, after a complete step 816 is executed in which recovery points are set with caution after intermediate results are not available. This is generally communicated to a central recovery control 818. This control 818 is updated during normal operation and takes over the processor control in case a recovery event occurs. The LU bit creates a dependency to the recovery point prior to its instruction. The same is valid for the NA bit. No recovery point can be set directly after an instruction with the NA bit set that is exploited by the processor. If an instruction has operands with the LU bit set, the recovery point may not be changed until the result of such instruction is being successfully completed. If the result of an NA instruction is flagged LU by the user, the recovery point may not be set prior to the successful completion by the user. To avoid chains of dependency in the recovery by the cost of less improvement, an implementation may discard the LU and NA bits to create recovery points deliberately.

The processor 100 may utilize the explicit or implicit freelist as a basis for carrying out a recovery that comprises one of a number of registers to be recovered, transferred or saved. For example, registers to be recovered may occur during the occurrence of a soft error during program execution (e.g., after bit failures in an array). Then, a recovery action may be started in which only those registers that contain needed data (i.e., "important" registers) are recovered by looking into the explicit or implicit freelist to determine those registers that are deemed important. This way, the number of registers needed to proceed is typically reduced. A transfer of registers may occur if the processor core fails or for some other reason there is a need to transfer only those registers to a new or different processor core that are deemed important. Again, those registers are indicated by the explicit or implicit freelist. Further, a save operation may involve a taking of the important registers as indicated by the freelist and located in, e.g., RAM and saving them, for example, on a hard disk or other type of memory.

Figure 12:
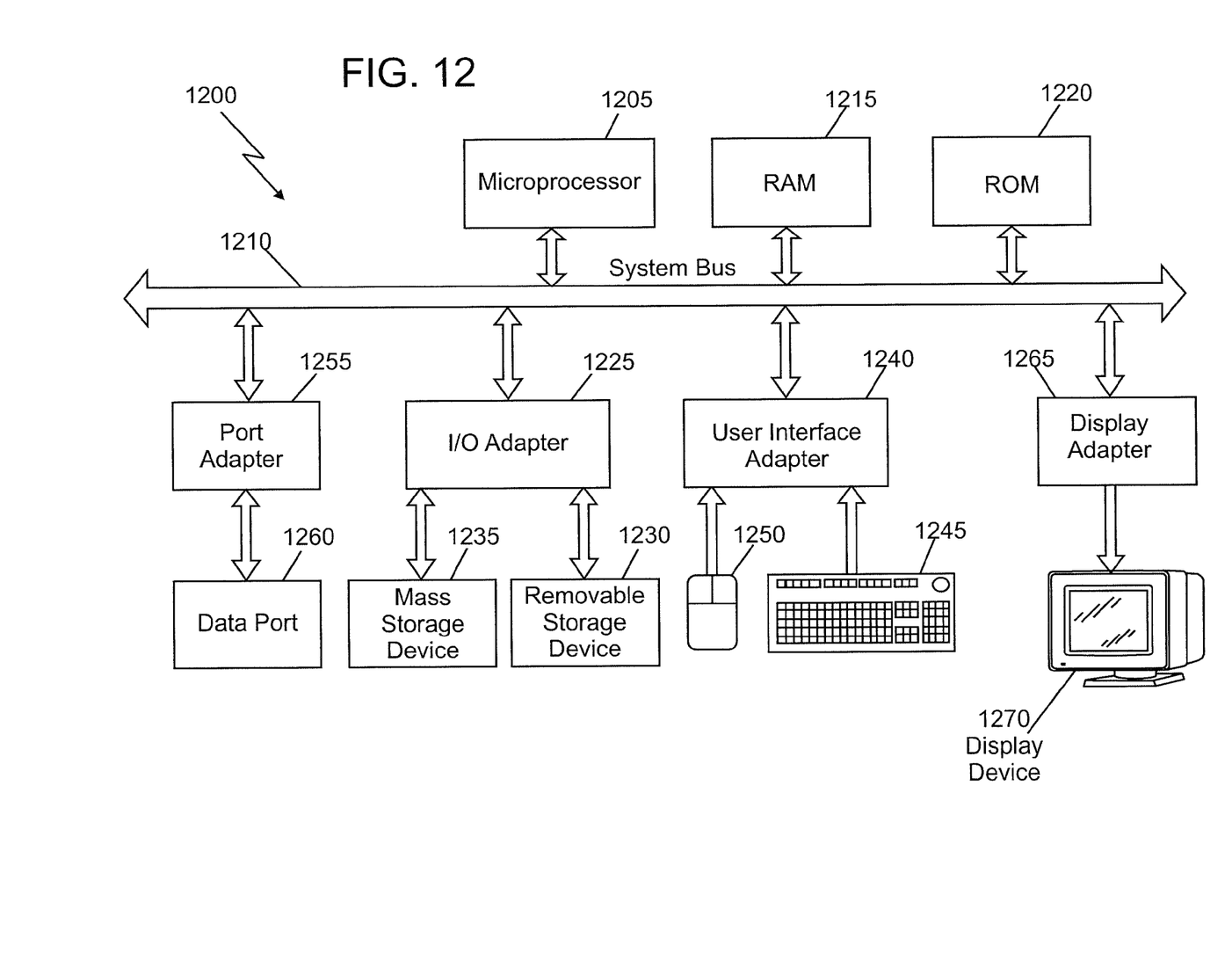
FIG. 12 is a schematic block diagram of a general-purpose computer suitable for practicing embodiments of the present invention.

Generally, the method embodiments disclosed herein may be practiced with a general-purpose computer and the embodiments may be coded as a set of instructions on removable or hard media for use by the general-purpose computer. That is, the processor utilized to practice embodiments of the invention may be part of a general-purpose computer system. FIG. 12 is a schematic block diagram of a general-purpose computer system 1200 suitable for practicing embodiments of the present invention. In FIG. 12, computer system 1200 has at least one microprocessor or central processing unit (CPU) 1205 that may comprise the processor utilized to practice embodiments of the invention. CPU 1205 is interconnected via a system bus 1210 to a random access memory (RAM) 1215, a read-only memory (ROM) 1220, an input/output (I/O) adapter 1225 for connecting a removable data and/or program storage device 1230 and a mass data and/or program storage device 1235, a user interface adapter 1240 for connecting a keyboard 1245 and a mouse 1250, a port adapter 1255 for connecting a data port 1260 and a display adapter 1265 for connecting a display device 1270.

ROM 1220 contains the basic operating system for computer system 1200. The operating system may alternatively reside in RAM 1215 or elsewhere as is known in the art. Examples of removable data and/or program storage device 1230 include magnetic media such as floppy drives and tape drives and optical media such as CD ROM drives. Examples of mass data and/or program storage device 1235 include hard disk drives and non-volatile memory such as flash memory. In addition to keyboard 1245 and mouse 1250, other user input devices such as trackballs, writing tablets, pressure pads, microphones, light pens and position-sensing screen displays may be connected to user interface 1240. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 1230, fed through data port 1260 or typed in using keyboard 1245.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   providing a processor; and
   causing the processor to execute an instruction that operates on an operand in at least one register, wherein the instruction includes at least one characteristic bit that conditionally influences the execution of the instruction by the processor in that the processor changes a number of registers in an explicit or implicit freelist that are operated on in executing the instruction with respect to a number of registers that would be operated on in executing the instruction if the at least one characteristic bit were not present, wherein the at least one characteristic bit indicates a result of an operation on the operand in the at least one register operated on by the processor when executing the instruction, wherein the indicated result of the operation on the operand in the at least one register comprises a not of architectural importance result of an intermediate type;

wherein in response to the characteristic bit being set and a signal indicating that one of a direct bypass or forwarding is available, at least one write to a register by the processor is avoided; and wherein in response to the characteristic bit being set and the signal indicating that direct bypass and forwarding are not available, the result of the operation is written to the register.

2. The method of claim 1, wherein the indicated result of an operation on the operand in the at least one register comprises a non-architected register result of intermediate type.

3. The method of claim 2, wherein the non-architected register result of intermediate type comprises one of a not final result or a not of architectural importance result.

4. The method of claim 2, wherein the non-architected register result occurs if one of a direct bypass or forwarding is available, thereby avoiding at least one write to a register by the processor.

5. The method of claim 1, wherein the processor comprises an in-order processor that executes instructions in an in-order sequence.

6. The method of claim 1, wherein the processor comprises an out-of-order processor that executes instructions in an out-of-order sequence.

7. The method of claim 1, wherein the at least one characteristic bit is utilized by a compiler to automatically generate instruction sequences for the processor.

8. The method of claim 1, wherein the processor utilizes the explicit or implicit freelist as a basis for carrying out a recovery that comprises one of a number of registers to be recovered, transferred or saved.

9. A system for implementing a method, comprising:
a computing network including a processing device in communication with one or more computer memory storage devices; and
the computing network further configured to implement a method, the method further comprising:
providing a processor; and
causing the processor to execute an instruction that operates on an operand in at least one register, wherein the instruction includes at least one characteristic bit that conditionally influences the execution of the instruction by the processor in that the processor changes a number of registers in an explicit or implicit freelist that are operated on in executing the instruction with respect to a number of registers that would be operated on in executing the instruction if the at least one characteristic bit were not present, wherein the at least one characteristic bit indicates a result of an operation on the operand in the at least one register operated on by the processor when executing the instruction, wherein the indicated result of the operation on the operand in the at least one register comprises a not of architectural importance result of an intermediate type;

wherein in response to the characteristic bit being set and a signal indicating that one of a direct bypass or forwarding is available, at least one write to a register by the processor is avoided; and wherein in response to the characteristic bit being set and the signal indicating that direct bypass and forwarding are not available, the result of the operation is written to the register.

10. The system of claim 9, wherein the indicated result of an operation on the operand in the at least one register comprises a non-architected register result of intermediate type.

11. The system of claim 10, wherein the non-architected register result occurs if one of a direct bypass or forwarding is available, thereby avoiding at least one write to a register by the processor.

12. The system of claim 9, wherein the instruction comprises one of an instruction that reads from architected registers or that writes to architected registers.

* * * * *